United States Patent [19]

Ishida et al.

[11] 4,289,285
[45] Sep. 15, 1981

[54] MAGNETIC TAPE CASSETTE

[75] Inventors: Toshihiko Ishida, Komoro; Takateru Satou, Saku, both of Japan

[73] Assignee: TDK Electronics Co. Ltd., Tokyo, Japan

[21] Appl. No.: 143,725

[22] Filed: Apr. 25, 1980

Related U.S. Application Data

[63] Continuation of Ser. No. 697,995, Jun. 21, 1976, abandoned.

[30] Foreign Application Priority Data

May 27, 1975 [JP] Japan ................................ 50-71056

[51] Int. Cl.³ .......................... G03B 1/04; G11B 15/32
[52] U.S. Cl. .................................................. 242/199
[58] Field of Search .............................. 242/197–200; 360/96, 132; 206/387; 354/344

[56] References Cited

U.S. PATENT DOCUMENTS

| 3,005,396 | 10/1961 | Keller | 354/344 |
| 3,142,599 | 7/1964 | Chavannes | 229/14 C |
| 3,655,114 | 4/1972 | Turner | 229/30 |
| 3,826,489 | 7/1974 | Watkins, Jr. | 360/132 |

Primary Examiner—Leonard D. Christian

[57] ABSTRACT

An improved magnetic tape cassette and separation sheet therefor. The separation sheet, positioned between an inner wall and the tape reels of a cassette, is formed with at least one dome-like protrusion. A plurality of such protrusions are preferably utilized spaced throughout the sheet, each of a diameter R and height H sized to provide an R/H ratio of between about 100 and 10. The separation sheet may be formed with a protrusion shaped to fit into a window in an inner case wall, the window-fitting protrusion extending from a side of said separation sheet opposite from that containing said dome-like protrusions.

9 Claims, 5 Drawing Figures

MAGNETIC TAPE CASSETTE

This is a continuation of application Ser. No. 697,995 filed June 21, 1976 and now abandoned.

BACKGROUND AND BRIEF DESCRIPTION OF THE INVENTION

This invention relates to magnetic tape cassettes, and concerns in particular a magnetic tape cassette having improved separation sheets for facilitating the smooth movement of the magnetic tape from one spool to the other during operation.

As is well known, a cassette consists of a generally rectangular case made of two equally sized halves, upper and lower, and a pair of tape spools housed in the case, with the tape wound on each spool to take a form of tape reel. The case is closed on all sides but one, and each spool is rotatably mounted on a hub supported by the case wall. In operation, the tape is transported from one spool to the other, the direction of the tape being dependent upon the mode of operation, which may be that of recording, reproducing or rewinding of the device in which the cassette is used.

The tape spool itself typically has no flanges extending alongside the reel of tape on both sides for guiding the running tape, that tape being taken up on or released from the reel by restraining the tendency of the reel-forming tape to displace itself sidewise. Because of the absence of such flanges, it has long been noted that, in this basic cassette construction, interference is likely to occur between the case walls and the tape in motion into or from the reel on each spool, resulting in impairment of smooth tape movement necessary for satisfactory recording and playback operations.

It has been general practice to avoid such interferences and thus ensure the smooth running of the tape by providing a separation sheet between case wall and tape reel; and for the material of the separation sheets, a synthetic material such as polyethylene terephthalate, carbon-impregnated fluorocarbon, carbon-coated polyester, silicone coated paper or any other similar material in sheet film or paper form, with or without a lubricating agent applied thereto, is used.

In order to interpose separation sheets, a clearance must be secured in the cassette design to accommodate the thickness of the separation sheet between each half-case and tape reel. If this clearance is too small, a contact will result between the sheet and the tape or the case wall to introduce friction adverse, in either instance, to the smooth running of the tape. On the other hand, if the clearance is too large, the separation sheets will not serve the purpose of guiding the tape and will allow the tape to be wound to form a disorderly reel or to be unwound and run in a wobbly manner, causing the tape edges to hit the separation sheets and suffer damage. Various improvements have been proposed with respect to the design of the separation sheet with a view to allowing the clearance to be as small as possible and yet minimizing the resultant friction.

In one example, G. D. Abitboul proposed, in U.S. Pat. No. 3,556,433, a bowed or flexed separation sheet. In another, P. G. Schmidt proposed, in U.S. Pat. No. 3,675,875, a sheet having horizontal corrugations. The flexure and horizontal corrugations purport to reduce the friction between running tape and separation sheet in the guiding action performed by the sheets. However, such separation sheets present manufacturing problems in that the flexure and the corrugations are hard to determine for the best friction reducing effect; also, it is difficult to keep the clearance within a practical tolerance in cassettes being mass-produced.

A purpose of this invention is to provide a magnetic tape cassette in which the tape is enabled to run smoothly. Another purpose is to eliminate the problems associated with the static friction of the tape. Still another purpose is to provide a means of ensuring the stable and accurate running motion of the tape. Other purposes are to provide a magnetic tape cassette in which the clearance between tape reel and half-case can be set precisely and to provide a separation sheet easy to manufacture and offering minimized friction in contact with the tape.

In the present invention, a separation sheet having at least one and preferably a plurality of dome-like protrusions spaced throughout the sheet is employed. The protrusions are preferably between about 0.1 and 0.5 mm in height (H) and between about 5 and 10 mm in diameter (R), with an R/H ratio of preferably between about 100 and 10. The separation sheet may advantageously be formed with an additional protrusion on the side thereof opposite from the dome-like protrusions and shaped to fit into a window included in the adjacent inner wall of the cassette case.

DETAILED DESCRIPTION

Figure 1:
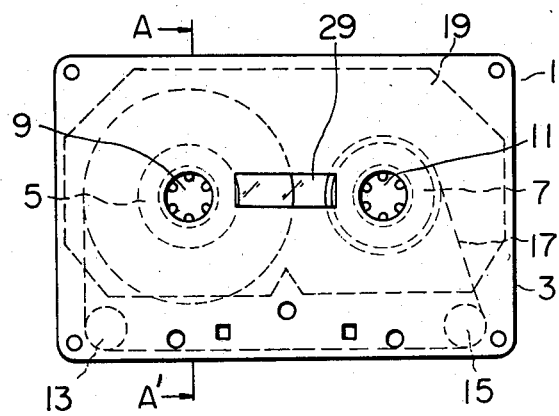
FIG. 1 is a plan view of a presently preferred form of magnetic tape cassette embodying the invention.
Figure 2:
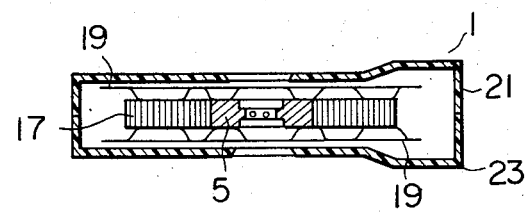
FIG. 2 is a sectional view of the cassette of FIG. 1, taken along the section A-A' in FIG. 1.

FIG. 1 shows sheet 19 as interposed between magnetic tape 17 and the internal wall of the half-case, and FIG. 2 clarifies this interposition by indicating two separation sheets 19, upper and lower, in cross section taken along line A—A of FIG. 1. Two separation sheets 19, indentically shaped and sized, are parallel to each other and located along upper case 21 on the upper side and along lower case 23 on the lower side as if to sandwich reels 5 and 7 of tape 17. It is possible to use only one sheet instead of two sheets and to locate it either on the upper side or on the lower side in order to achieve the stated purposes of this invention.

Figure 3:
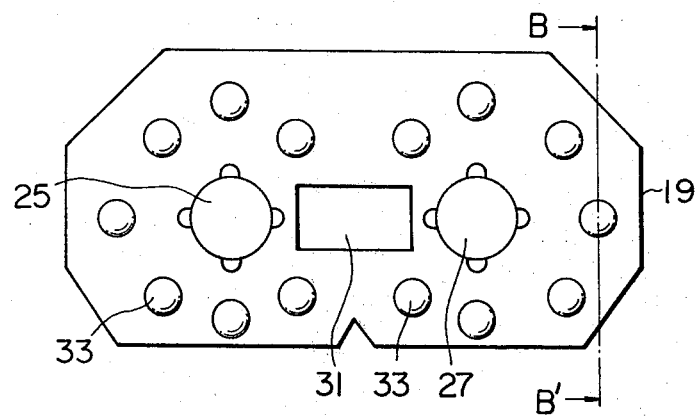
FIG. 3 is a plan view of a preferred separation sheet for a magnetic tape cassette embodying the invention.
Figure 4:
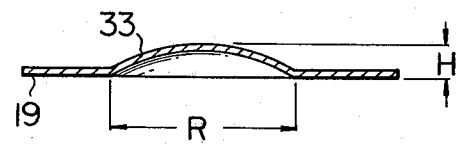
FIG. 4 is a sectional view of the separation sheet of FIG. 3, taken along the section line B-B' in FIG. 3.

Referring to the plan view of the separation sheet 19 shown in FIG. 3, it should be noted that the sheet has a pair of openings 25 and 27 and another opening 31 corresponding to the central openings 9, 11 and window 29, as shown in FIG. 1, provided in each wall of the cassette 1. Openings 25, 27 are in registry with openings 9,11, and opening 31 is in registry with window 29, which is, as is well known, for rendering reels 5, 7 visually observable, and is normally fitted with a transparent plastic pane. Each separation sheet 19 is formed to present preferably a plurality of rounded or dome-like protrusions 33 extending toward tape reels 5,7, each protrusion being shaped and sized by giving proper values to its dimensions R and H (designated in FIG. 4). It is apparent from FIGS. 3 and 5 that the dome-like protrusions 33 are spaced generally in a symmetrical pattern, e.g., generally in semi-circular arcs, about the axes of the tape reels 5 and 7.

In a preferred embodiment of this invention as illustrated, separation sheets are made of polyethylene terephthalate resin or silicone coated paper to provide low friction surfaces on the sides of the sheets, and sized to measure about 0.1 mm in thickness, with its protrusions 33 sized about 7 mm for dimension R or diameter and about 0.3 mm for dimension H or height. A total of 14 such protrusions are formed of each sheet. The tape cassette according to this invention, therefore, has its magnetic tape remaining approximately in point contact with the separation sheets, so that the force of friction acting on the tape in operation is minimized to ensure smooth tape movement. It will be obvious that the dome-like protrusions formed of the separation sheet are hard to deform. The manufacturing advantages accruing from the magnetic tape cassette according to this invention reside in that such separation sheets with hard-to-deform protrusions allow the clearance between tape and half-case to be more accurately secured during manufacture, and that the sheets are simpler in shape and easier to make.

Figure 5:
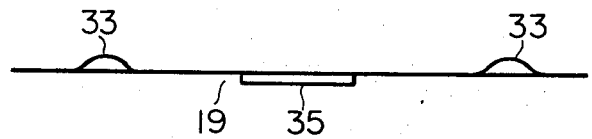
FIG. 5 is a simplified side view of an alternative form of separation sheet embodying the invention, showing a window-fitting protruberance therein.

Although the separation sheets 19 of the preferred embodiment thus far described have an opening 31, which is so located and sized to be in exact registry with window 29 provided in the cassette case, this opening 31 may be replaced by a protrusion 35, integral with the sheet and extending from its outer surface. Referring to FIG. 5, which shows protrusion 35 in cross section, it will be obvious that the sheet is transparent and that this protrusion is shaped to enter window 29 with a sliding fit, thereby taking the place of the transparent plastic pane normally fitted to the window and thus simplifying the cassette construction. With such separation sheets having protrusion 35 extending in a direction opposite to that of protrusions 33, i.e., with protrusions 33 and 35 on opposite sides of the separation sheet, the possibility of inserting separation sheets in inverted position during assembly of the tape cassette is avoided because protrusion 35 makes the outer and inner sides of each separation sheet more distinct from each other.

Polyethylene terephthalate resin considered as the material of separation sheets in a preferred embodiment is illustrative, and may be replaced by carbon-coated polyester, carbon impregnated flurocarbon or any other similar material. For the best effect in accomplishing the stated purposes of this invention, it has been experimentally confirmed that a sheet thickness of anywhere between 0.05 mm and 0.25 mm for separation sheets 19, with protrusions 33 sized to measure from 0.1 to 0.5 mm in height and from 5 to 10 mm in diameter, is preferred. It has been found also that, in regard to the shape of protrusion 33, a diameter-to-height ratio, or R/H, of anywhere between 100 and 10 produces the best result. The number of protrusions 33 and their diameter, however, need to be determined in each individual instance by taking into account the frictional force which the tape experiences in motion.

Accordingly, the dimensions and materials given above are representative, and the invention should be taken to de defined by the following claims.

What is claimed is:

1. In a separation sheet for a magnetic tape cassette comprising a sheet to be positioned between an inner wall and the tape reels of a cassette, the improvement in which the sheet is formed with at least one dome-like protrusion, in which said sheet is formed with an additional protrusion on a side of said sheet opposite from that containing said dome-like protrusion and shaped to fit into a window formed in said inner wall of said cassette.

2. In a magnetic tape cassette comprising a case that houses rotatable tape reels, said case including an inner wall adjacent to said reels, guide means for guiding the magnetic tape from one reel to another, and a separation sheet interposed between said inner case wall and said magnetic tape reels; the improvement in which said separation sheet is formed with a plurality of dome-like protrusions spaced throughout said sheet, in which said inner case wall includes a window therein, and said separation sheet is formed with a protrusion shaped to fit into said window.

3. A magnetic tape cassette according to claim 2, in which said dome-like and said shaped protrusions are on opposite sides of said separation sheet.

4. In a magnetic tape cassette comprising a case that houses rotatable tape reels, said case including an inner wall adjacent to said reels and extending generally perpendicular to the axes of said reels, guide means for guiding the magnetic tape from one reel to another, and a separation sheet interposed between said inner case wall and said magnetic tape reels and lying generally parallel to said inner wall; the improvement in which said separation sheet is formed with a plurality of generally semi-hemispherical dome-like protrusions spaced throughout said sheet on the side thereof adjacent to said tape reels, and said protrusions are spaced one from another generally in a symmetrical pattern about the axes of said rotatable tape reels.

5. A magnetic tape cassette according to claim 4, in which said protrusions are sized between about 0.1 and 0.5 mm in height.

6. A magnetic tape cassette according to claim 4, in which said protrusions are sized between about 5 and 10 mm in diameter.

7. A magnetic tape cassette according to claim 4, in which said protrusions are of a diameter R and height H sized to provide an R/H ratio of between about 100 and 10.

8. A magnetic tape cassette according to claim 4, in which said separation sheet includes a surface of low-friction material adjacent said tape.

9. A magnetic tape cassette according to claim 4, in which said generally symmetrical pattern comprises generally semi-circular arcs.

* * * * *